Aug. 5, 1952   T. E. LARKIN   2,606,240
CONTROL SYSTEM FOR FUEL DELIVERY AND SERVICES
Filed May 21, 1949

Inventor
T. E. Larkin

Patented Aug. 5, 1952

UNITED STATES PATENT OFFICE 2,606,240

CONTROL SYSTEM FOR FUEL DELIVERY AND SERVICES

Thomas E. Larkin, Schenectady, N. Y.

Application May 21, 1949, Serial No. 94,698

7 Claims. (Cl. 177—311)

My invention pertains to fuel delivery control systems for ascertaining the fuel consumption of the customers of a fuel dealer in order that fuel deliveries can be scheduled efficiently, and also for ascertaining the different cumulative effective weather exposures in the areas of the locality served by the dealer in order to determine the efficiency of the heating system of each customer.

Systems in use attempting to forecast the necessity of fuel delivery, are based upon the "degree day." This unit is defined by the American Society of Heating and Ventilating Engineers as "a degree day is a time and temperature unit equivalent to an inside minus outside temperature difference of 1° Fahrenheit prevailing for a period of one day." It can be seen that the only weather condition contemplated in the definition is temperature. Actually, this is not a true indication of the amount of exposure occurring in an area since conditions of weather exposure other than mere difference in atmospheric temperature affect the exposure of a building such as wind, which by keeping air moving lowers the temperature of the outside wall of a building increasing the heat loss. Rain has a similar effect, in that cold water flowing down the outside walls lowers their temperature. Sunshine, by means of radiant heat, increases the temperature of the outside walls of the building and shining through windows heats the atmosphere inside the building, while clouds are the absence of sunlight.

The existing systems estimate the rate of consumption of fuel of a customer by dividing the number of fuel units consumed by him during a period by the number of degree days of exposure ocuuring during that period. By applying this rate of consumption to any supply of fuel, an attempt is made to determine the rate of consumption of fuel and the time when the supply should be exhausted. Due to the wide variations in the weather conditions other than temperature that continually occur this system is very inaccurate. I have devised a system by which the net effect of all the exposure conditions occurring in an area is determined by the use of an effective degree day which I have named "weather day." A weather day is an inside minus outside temperature difference of 1° Fahrenheit combined temperature effect of all the weather elements below a fixed datum for a period of 24 hours.

An object of my invention is to provide a system by means of which a remotely located computer unit accurately indicates the consumption of an energy storage supply by condition changing devices. Another object of my invention is to provide a system by means of which a remotely located computer unit accurately indicates the amount of a source of energy supply in storage containers of heating installations.

A further object of my invention is to provide a system by means of which a remotely located computer unit continuously and accurately indicates the amount of weather exposure in an area.

A still further object of my invention is to provide a method of calibrating a sensing device whereby the device is responsive to the total heating effect of atmospheric exposure.

According to my invention an exposure sensing device placed in a representative position in each area of different weather exposure in the locality of the customers of a fuel distributor senses the weather days of exposure occurring therein and emits a corresponding signal causing the chip wheel of a corresponding remote computer unit to rotate according to the weather days exposure in the area. The normal rate of consumption of each customer in an area is determined by dividing the quantity of fuel used by the weather days exposure in that area. For subsequent fuel deliveries the fuel storage of the customer in excess of an emergency supply is entered in an index in the office of the fuel distributor, translated into weather days as determined from his normal rate of consumption of fuel. This quantity is represented by a chip in a slot of the rotating wheel situated at the time of delivery at an appropriate angular distance ahead of a reference point. When the table rotates through an angle corresponding to the fuel supply of the customer, the chip is expelled at the reference point indicating that the current supply of fuel is exhausted and should be replenished. If the fuel supply of a customer is exhausted before the reference point is reached, a decrease in efficiency of the customer's heating system is indicated.

For a better understanding of my invention, attention is directed to the accompanying drawing of a particular embodiment of my invention in which—

Figures 1, 2:
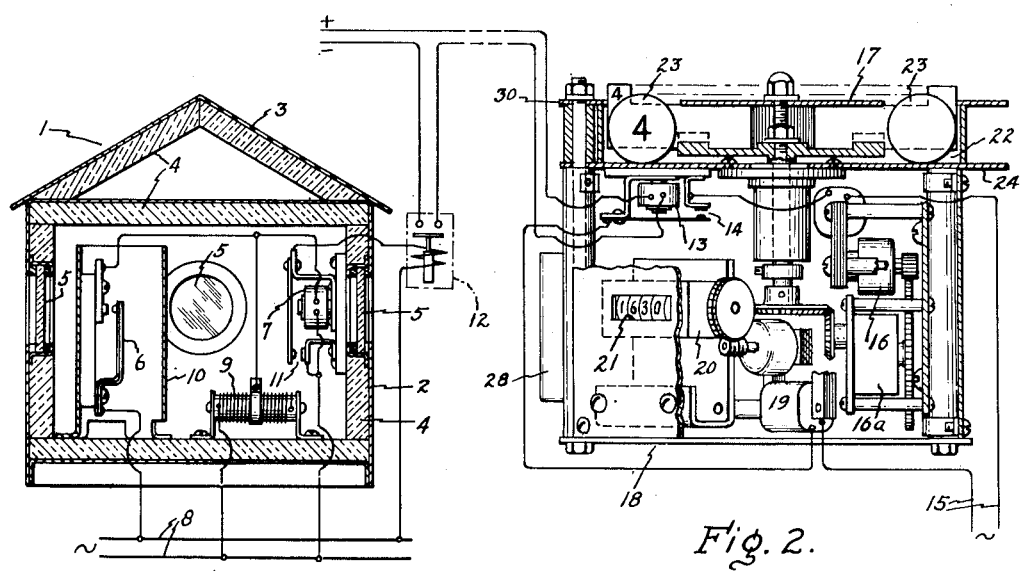
Fig. 1 is a partially sectional view of the signal house.
Fig. 2 is a partially sectional view of the vertical elevation of the receiver unit.
Figure 3:
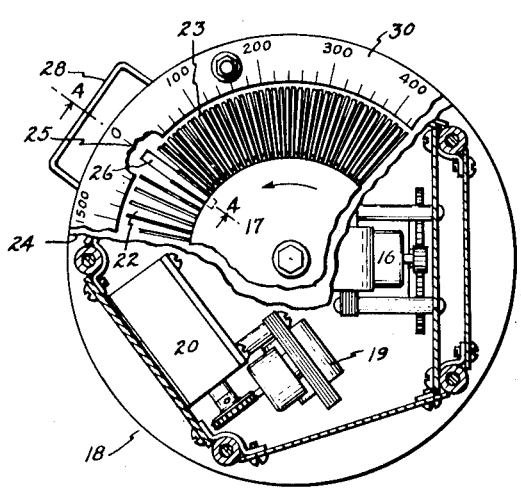
Fig. 3 is a plan view of the computer unit.
Figure 4:
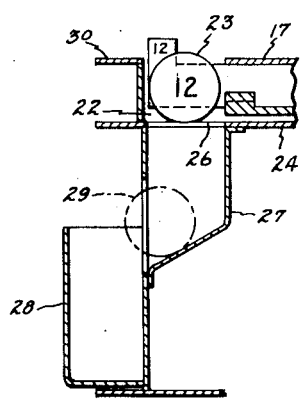
Fig. 4 is a section of the computer unit taken along the line 4—4 of Fig. 3, looking in the direction of the arrows.

From the drawing, the signal house or signal unit 1 has a side wall 2, a roof 3 and insulation 4. The dimensions and insulation, are in such proportions that the heat loss per square foot of floor area is the same as that of an average American building and the model house is painted a light gray to approximate the color surface of the average building.

Windows 5 are incorporated in the walls of the signal house of such relative area as to approximate the heating effect of radiation through the windows of the average building. A thermostat 6 within the house, is set to maintain the interior temperature of the house at 70° Fahrenheit. The thermostat and the coil of a relay 7 in series are connected across the wires of an electric circuit 8 in parallel with an adjustable resistance 9. A cylindrical shield 10 surrounds the thermostat 6 to prevent the heating effect due to radiant heat rays from hitting the thermostat directly. When the temperature of the house drops below 70° Fahrenheit the thermostat 6 closes, energizing the resistance 9 to heat the house. The resistance 9 remains energized until the house temperature again reaches 70° when the thermostat 6 breaks the circuit. While the thermostat 6 is closed, the relay 7 is energized, picking up the relay contacts 11, thereby closing the circuit of a suitable communication means 12 between the signal house and the computer and causing the relay 13 in the computer to operate while thermostat 6 is closed. While the relay 13 is picked up, the contacts 14 close the circuit 15 to operate the motor 16 geared through gear train 16a to the chip wheel 17 of the computer 18 and simultaneously to operate the motor 19, in series in the circuit 15. The motor 19 operates a totalizer unit 20 indicating through the window 21 the total number of weather days exposure on the signal house.

The chip wheel is a circular table divided into equal sectors, each representing 20 weather days and each containing a bottomless slot 22 to carry a numbered chip 23. The chip wheel 17 rotates over a plate 24 that retains the chips in the slots. At the reference point 25, the plate 24 is supplied with an aperture 26 through which the chips successively drop into the chute 27 and thence into the cup 28. The phantom circle 29 represents a chip on its way through the passage 27.

The speed of rotation of the chip wheel is adjusted so that a sector passes the reference point and drops its chip into the cup 28 for each 20 weather days of exposure signal from the signal house. A circular indexing ring 30 is mounted on the computer unit surrounding the table divided into segments corresponding to the sectors of the chip wheel. The ring is indexed in weather days in numbers beginning with the reference point 25 and ascending in the direction counter to the direction of rotation of the table. Numbered chips are appropriately placed in slots of the rotating table.

The signal house is calibrated to temperature alone in a dark room in still air to eliminate the effects of weather other than temperature. Since the thermostat is shielded from radiant heat when it is installed in the house, it responds to the temperature of the atmosphere within the house which is the result of the atmospheric conditions to which the house is exposed, and hence the amount of current required to heat the signal house to datum temperature is directly proportional to the weather days to which the house is exposed, and therefore the signal generated by the signalling means is a representation of the exposure in the area in which the signal house is located. Since the speed of rotation of the corresponding chip wheel is proportional to the signal generated it is also proportional to the exposure in the area.

The locality including the buildings of the customers and potential customers of a fuel distributor contains many areas of differing conditions of weather exposure. For instance, the altitude and wind exposure conditions vary considerably even in a small city. To cover these variations, signal houses are established in sections of different weather conditions. The central office of the dealer contains a computer corresponding to each model house.

In accordance with my invention, the normal rate of consumption of fuel by a customer is determined in fuel units per weather day of effective degree days from his consumption of the first few deliveries of fuel made to him. This unit I call B, the individual building or use factor, expressed in fuel units per weather day. It is obtained by dividing the number of fuel units in the first few deliveries by the weather days exposure that occurred during their consumption as registered by the totalizer. When a fuel delivery is made to a customer his current fuel supply consisting of the amount of fuel storage in his tank in excess of a standby supply is converted into weather days at his own rate of consumption by dividing by his individual B factor.

The fuel supply of this customer and the other customers of the same locality having an equal current weather day fuel supply are represented by a chip carried in an appropriate slot in the chip wheel 17 as indicated by the indexing ring 30 to impart to computer 18 a positional impulse corresponding thereto. As the chip wheel rotates carrying the designated chip towards the reference point and the number of weather days exposure in the area equals the number of weather days current supply represented by any chip, that chip is expelled into the cup. The dealer is thus informed that the fuel supply of those customers represented by that chip needs replenishing.

From this explanation, it can be seen that if the customer's fuel supply should become depleted earlier, his heating equipment is not functioning as it was when his normal rate of fuel consumption was determined, affording the dealer an accurate check on the efficiency of each customer's heating unit at each refueling so that the dealer can offer information regarding fuel consumption efficiency as an additional customer service.

While certain specific embodiments have been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. A sensing apparatus for measuring the duration and extent of exposure in an area below a datum of atmospheric condition of still, dry air in darkness and at a predetermined value of temperature comprising a signal pilot house exposed to the atmospheric conditions of said area, said signal house having the relative proportions of an average building, a heating means to supply the heat loss of said house due to said exposure, a sensing device responsive to drop in temperature in said house calibrated to said datum and in said pilot house below said predetermined temperature value to energize said heating means, means responsive to said heating means to promulgate a signal proportional to the energy supplied to said heating means.

2. A system for predicting the consumption of supplies of fuel of heating installations of buildings in an area according to respective predetermined exposure-rates of consumption of said fuel by said heating installations comprising an insulated pilot structure enclosing a space and having the relative proportions of an average building, said structure being exposed to the atmosphere of said area, a source of electrical supply, means supplied from said source for heating said space to compensate for heat loss of said structure to said atmosphere below a datum of still, dry air in darkness and at a predetermined temperature value, means calibrated to said datum and responsive to decrease in ambient temperature of said space below said predetermined temperature value to energize said heating means, means for signalling responsive to energization of said heating means to promulgate a signal proportionate to said heat loss and computing means responsive to said signalling means and to said predetermined exposurerates to indicate a prediction of the fuel consumptions of said supplies of fuel.

3. A system for predicting the consumption of supplies of fuel of heating installations of buildings in an area comprising in combination, an insulated structure enclosing a space and having the proportions of an average building, said structure being exposed to the atmosphere of said area, a source of electrical supply, means supplied for heating said space to compensate for the heat loss of said structure to said atmosphere, sensing means connected to said supply and responsive to decrease in ambient temperature of said space below a predetermined value to energize said heating means, means responsive to energization of said heating means to promulgate a signal proportionate thereto, indexing means including a first member having a stationary reference point, a second member movable with respect to said first member in response to a signal from said signal means, markers corresponding to said supplies mounted upon said second member, said markers being spaced from said reference point in the direction opposite to said movement proportionately to the value of said supplies according to predetermined rates of consumption of said supplies by said heating installations with respect to said condition.

4. A system for ascertaining the consumption of supplies of fuel of heating installations of buildings in an area comprising a structure having members enclosing a space, insulation lining said members, paint covering the outside surface of said members and glass windows encased in said members, said members, insulation, paint and windows being assembled in the proportions of an average building, a source of electric current, means responsive to decrease in ambient temperature of said space below a predetermined value connected to said current source, heating means connected to said current source and controlled by said temperature responsive means to replace the heat loss of said structure due to exposure thereof to said atmosphere, signal means responsive to said heating means to produce impulses proportionate to said supplied heat, computing means including a motor mounted upon a base, said base having a reference point mounted thereon, a member movable with respect to said reference point by said motor in response to said impulses, means for identifying each of said installations respectively mounted upon said movable member and spaced from said reference point in the direction opposite to said movement at an interval equal to the amount of fuel supplies therein divided by the corresponding predetermined time rates of consumption of said fuel so that upon rotation of said motor coincidence of said identifying means with said reference point indicates consumption of the corresponding fuel supplies.

5. A device for indicating the total cooling effect of the atmosphere upon buildings in an area over a period comprising a pilot structure exposed to the atmosphere and having members enclosing a space, insulation lining said members, paint covering the outside surface of said members and glass windows encased in said members, said members, insulation, paint and windows being assembled in the proportions of an average building, a source of electric current, means supplied by said source and calibrated to a datum of still, dry air in darkness at a predetermined temperature for supplying heat to said space in response to decrease below said predetermined temperature and an indicator having a stationary reference and a pointer movable with respect to said reference and responsive to signals from said calibrated means proportionate to said supplied heat to indicate said total cooling effect.

6. A device for computing the consumption of a source of energy supply by a condition changing means, comprising a base having a reference point thereon, a motor rotatable in response to said condition mounted upon said base, a chip wheel provided with radial slots mounted upon the shaft of said motor to be rotatable with respect to said reference point, a chip representing said supply disposed in a slot in said wheel, said slot being spaced from said reference point at an interval corresponding to the amount of said supply with respect to the predetermined consumption of said condition changing means, means for discharging said chip as said slot is rotated to said reference point so that the discharge of said chip indicates the consumption of said energy source.

7. In a system for predicting the consumption of a supply of fuel by a heater in supplying the heat loss of a building in an area to conditions of the atmosphere of said area below a datum of still, dry air in darkness and at a predetermined temperature including an insulated pilot house positioned in said area having the relative proportions of an average building and provided with means calibrated to said datum for providing a supply of heat to maintain the interior of said pilot house at said predetermined temperature, a computer including a stationary member having a reference thereon, a movable indicator and a marker representative of said fuel supply for positioning on said indicator at an interval from said reference proportionate to the value of said fuel supply with respect to the predetermined rate of consumption of said fuel by said heater, said computer being responsive to signals from said calibrated means proportionate to said supply of heat to move said marker towards said reference to predict consumption of said fuel supply by said heater, arrival of said marker at said reference being the prediction of exhaustion of said fuel supply, and an indicator dial mounted upon said computer having a pointer thereon movable responsive to signals from said calibrated means proportionate to said heat supply to indicate the total cooling effect of the atmosphere on said building over a period.

THOMAS E. LARKIN.

REFERENCES CITED

The following references are of record in the file of this patent:

UNITED STATES PATENTS

| Number | Name | Date |
| --- | --- | --- |
| 1,588,581 | Ingram et al. | June 15, 1926 |
| 1,992,945 | Haselton et al. | Mar. 5, 1935 |
| 2,435,907 | Shirokauer | Feb. 10, 1948 |